United States Patent [19]

Alten

[11] Patent Number: 5,450,696

[45] Date of Patent: Sep. 19, 1995

[54] DEFORMABLE SEALING DEVICE OF A GAP BETWEEN THE EDGES OF A WALL OPENING AND THE BACK WALL OF A VEHICLE DOCKING AT THE WALL OPENING

[76] Inventor: Kurt Alten, Ringstr. 14, D-30974 Wennigsen, Germany

[21] Appl. No.: 167,577

[22] Filed: Dec. 14, 1993

[30] Foreign Application Priority Data

Dec. 14, 1992 [DE] Germany .................. 42 42 087.3

[51] Int. Cl.⁶ ............................ E04B 7/16; E06B 7/00
[52] U.S. Cl. .................................................. 52/173.2
[58] Field of Search ................................. 52/173.2

[56] References Cited

U.S. PATENT DOCUMENTS

| | | | |
|---|---|---|---|
| 3,461,627 | 8/1969 | Conger | 52/173.2 |
| 3,528,086 | 3/1968 | Conger | 52/173.2 X |
| 4,825,606 | 5/1989 | Alten | 52/173.2 |
| 5,167,101 | 12/1992 | Alten | 52/173.2 |
| 5,174,075 | 12/1992 | Alten | 52/173.2 |
| 5,174,084 | 12/1992 | Alten | 52/173.2 |
| 5,195,285 | 3/1993 | Alten | 52/173.2 |

FOREIGN PATENT DOCUMENTS

| | | | |
|---|---|---|---|
| 7422444 | 7/1974 | Germany . | |
| 2428989 | 1/1976 | Germany | 52/173.2 |
| 2717146 | 11/1978 | Germany | 52/173.2 |
| 8210653 | 8/1982 | Germany . | |
| 3840061 | 9/1990 | Germany . | |
| 9107819 | 10/1991 | Germany . | |
| 9116495 | 1/1993 | Germany . | |
| 590395 | 8/1977 | Switzerland . | |

*Primary Examiner*—Carl D. Friedman
*Assistant Examiner*—Robert Canfield
*Attorney, Agent, or Firm*—Robert W. Becker & Associates

[57] ABSTRACT

A deformable sealing device for a gap between a wall opening of a building wall and a back wall of a vehicle docking at the wall opening has a flap-shaped deformable skirt for receiving loads exerted by the back wall of the vehicle docking at the wall opening. The skirt has an upper transverse portion with a transverse beam and two vertical strips arranged parallel to the vertical sides of the wall opening. A cover is connected between the transverse beam and the building wall. The skirt has flap-shaped, deformable, non-stiff side portions in the form of tarpaulins having forward edges connected to the outer edges of the vertical strips and rearward edges connected to the building wall. The side portions and the vertical strips are vertically spaced at a distance from the cover such that the side portions and the vertical strips are deformable toward the building wall independent of the upper transverse portion. An elastic and bendable mechanism for suspending the side portions engages upper ends of the side portions. A stretching mechanism for maintaining a full horizontal extension of the side portions, when the sealing device is in its rest position, is provided at a lower end of the side portions.

17 Claims, 3 Drawing Sheets

DEFORMABLE SEALING DEVICE OF A GAP BETWEEN THE EDGES OF A WALL OPENING AND THE BACK WALL OF A VEHICLE DOCKING AT THE WALL OPENING

BACKGROUND OF THE INVENTION

The present invention relates to a deformable sealing device for a gap between the edges of a wall opening and the back wall of a vehicle docking at the wall opening. The sealing device has a flap-shaped deformable skirt comprised of two vertical strips on either side of the wall opening and an upper transverse portion in the area of the upper ends of the vertical strips with a cover extending from the upper transverse portion backward toward the building, whereby the two strips with their laterally outwardly positioned edges are connected to the forward edges of deformable side portions anchored rearwardly at the building and whereby the side portions together with the vertical strips end at a distance below the cover such that the two strips and the side portions are deformable by a load exerted by a vehicle independent of the upper transverse portion.

In known sealing devices of the aforementioned kind the side portions are in the form of foamed rubber packages or strong springs and designed such that they are self-supporting. This compact construction, however, results in that an easy deformability of the sealing device for adaptation to the back wall of a vehicle is not always guaranteed in a satisfactory manner.

It is therefore an object of the present invention to eliminate the aforementioned disadvantages with a special construction of the side portions and their suspension such that the construction is simplified and the deformability is improved.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
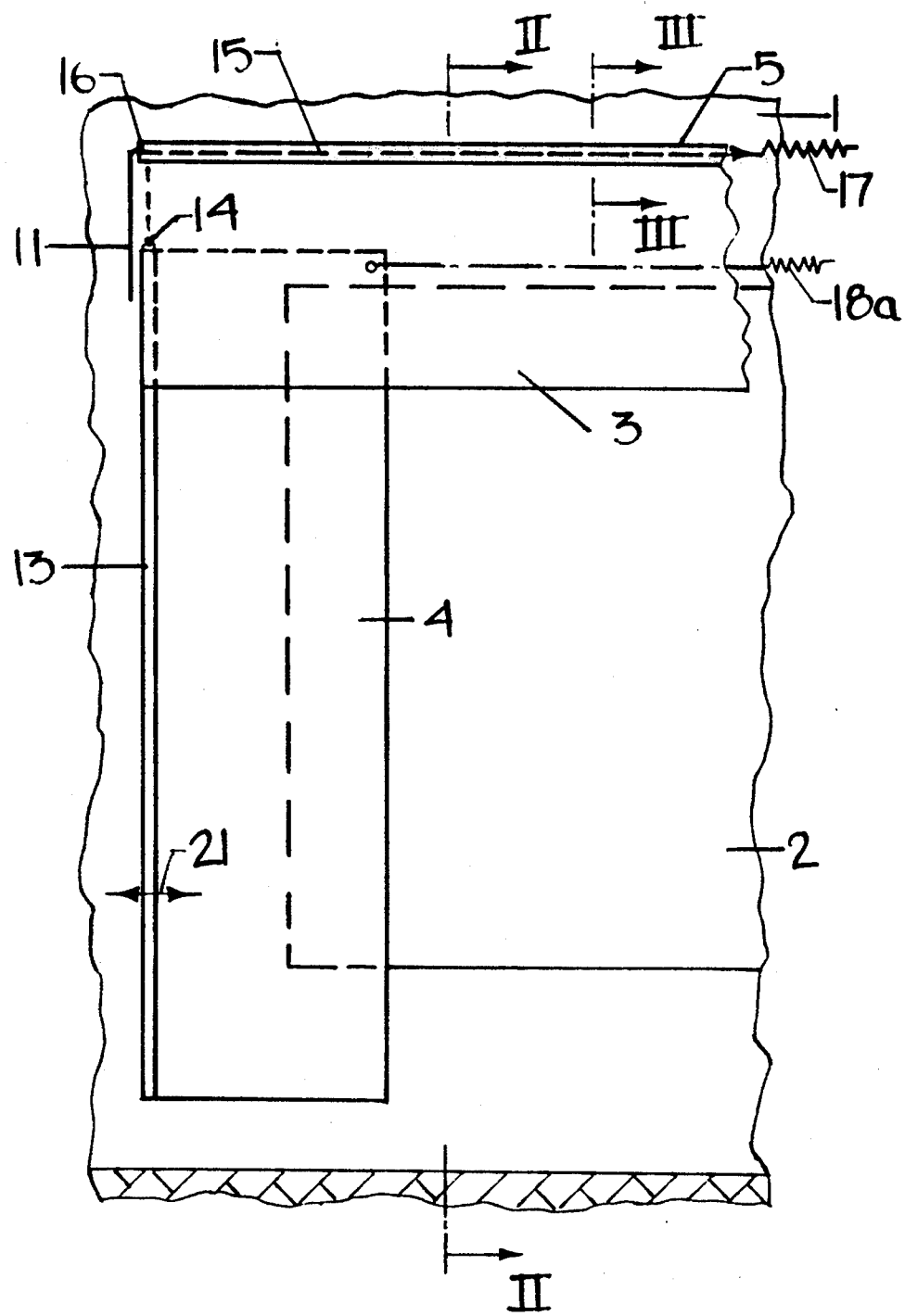
FIG. 1 shows in a front view the left half of a deformable sealing device for a gap between the edges of a wall opening and the backwall of a vehicle docking at the wall opening.

A deformable sealing device for a gap between a wall opening of a building wall and a backwall of a vehicle docking at the wall opening according to the present invention is primarily characterized by:

A flap-shaped deformable skirt for receiving loads by the back wall of the vehicle docking at the wall opening, the skirt comprising an upper transverse portion with a transverse beam and two vertical strips that are arranged parallel to the vertical sides of the wall opening;

A cover connected between the transverse beam and the building wall;

The vertical strips having vertically extending outer edges;

The skirt further comprising flap-shaped deformable non-stiff side portions in the form of tarpaulins having forward edges connected to the outer edges of the vertical strip and rearward edges connected to the building wall, wherein the side portions and the vertical strips are vertically spaced at a distance from the cover such that the side portions and the vertical strips are deformable in a direction toward the building wall independent of the upper transverse portion;

A suspending mechanism for suspending the side portions, the suspending mechanism engaging upper ends of the side portions and being elastic and bendable; and A stretching mechanism for maintaining a full horizontal extension of the side portions at a lower end thereof, when the sealing device is in a rest position.

Preferably, the stretching mechanism in a longitudinal direction thereof is rigid to pressure loads and bendable and displaceable when forces act in a direction other than the longitudinal direction.

Advantageously, the side portions and the vertical strips are supported by the suspending mechanism.

In a preferred embodiment of the present invention, the stretching mechanism is a stay for connecting the forward edge of the side portion to the building wall, the stay extending in a slanted downward direction from the building wall toward the forward edge. Preferably, the stay is positioned at an angle of 30° to 60° to the vertical, more preferred at an angle of substantially 45°.

Expediently, the suspending mechanism is comprised of a cable line and an intermediate tension spring, wherein the cable line is supported at the transverse beam. Preferably, the cable line is hidden by the transverse beam.

In a preferred embodiment, the stretching mechanism is a tightly wound tension spring. Preferably, each vertical strip has a stiffened edge profile at the outer edge, and the tension spring has free ends fixedly connected to the building wall and the stiffened edge profile.

Advantageously, the stretching mechanism is a rigid stay pivotably connected to the side portion and the building wall.

Advantageously, the upper transverse portion is liftable together with the transverse beam and the cover. Expediently, the sealing device further comprises a stay fixedly connected to the transverse beam and extending in a slanted downward direction toward the building wall, wherein a free end of the stay is supported in a height-adjustable manner at the building wall.

Preferably, the sealing device further comprises a stiffened edge profile for stiffening the outer edge of the vertical strip and the forward edge of the side portion.

Advantageously, the stretching mechanism engages the stiffened edge profile.

In another embodiment of present invention, the stretching mechanism is elastically deformable.

Preferably, the suspending mechanism engages the upper edges of the side portions remote from the building wall, the upper edges being stiffened.

According to the present invention, the side portions are flap-shaped, easily deformable, non-stiff tarpaulins that are suspended with their upper ends from an elastic, bendable suspending mechanism and have at their lower ends elastic stretching mechanisms that maintain their full horizontal extension when the sealing device is in its rest position.

Accordingly, for the side portions easily deformable tarpaulins are used. Thus, there is no requirement for a stiff self-supporting construction. Furthermore, due to the elastic suspension and the stretching mechanism at the lower end of the side portions no guides or other guiding means in the form of the known frame construction are needed. Due to the present invention, the shape of the side portions and the shape of the vertical strips connected therewith are ensured due to the aforementioned elastic suspension mechanism that is preferably embodied with the aid of the transverse beam of the upper transverse portion. In addition, the two vertical strips may be connected with one another by elastic cables etc. and/or may be also elastically suspended.

DESCRIPTION OF PREFERRED EMBODIMENTS

The present invention will now be described in detail with the aid of several specific embodiments utilizing FIGS. 1 through 4.

The building wall 1 of the building, for example, a warehouse, has a wall opening 2 that can be closed by a sectional gate. In order to seal the gap between the edge of this wall opening and the back wall of a vehicle docking at the wall opening, a deformable sealing device according to the drawings of the present invention is provided in order to be able to perform loading and unloading without impairment by weather conditions.

At a distance from the building wall 1, a deformable skirt is provided which is comprised of an upper transverse portion 3 and two vertically extending strips 4 on both sides of the wall opening 2. The upper transverse portion 3 which is positioned in front of the strips 4 is supported like a curtain and is connected with its upper end with a stiff transverse beam 5 that is supported by upwardly extending stays 6.

A metal member 7 is connected to the transverse beam 5 which serves for supporting (fastening) the transverse portion 3 and a cover 8 which, with its rearward end, is connected to the building wall 1.

The two stays 6 which are arranged within the area of the ends of the transverse portion 3 are rigidly connected with the transverse beam 5. However, the stays 6 are pivotable at their lower end at a gliding member 28 and are thus movable in the direction of arrow 9. The gliding member 28 may be connected in vertical guides 10 connected to the building wall 1 in order to perform lifting movements. Accordingly, the transverse portion 3 with the transverse beam 5 and the cover 8 can perform lifting movements which may be needed, for example, for respectively high vehicles or due to lifting movements of container-carrying trucks.

On both lateral ends of the cover 8 overhangs 11 are provided in the form of freely suspended flaps.

For the evaluation of the invention the side portions 12 that seal the sealing device in the outward direction are of special importance. They are connected with one edge to the building wall 1 and with the other edge to a vertically extending edge profile 13 that supports the vertical strip 4. Accordingly, the side portions 12 bridge in a sealing manner the distance between the side wall and the lateral (outer) edges of the strips 4. The parts 4, 12 are made of a flap-like foil material that can adapt to the contour of the vehicle, but is pull and tear-resistant. For this purpose, a fabric that is coated with rubber or plastic material may be used.

Figure 2:
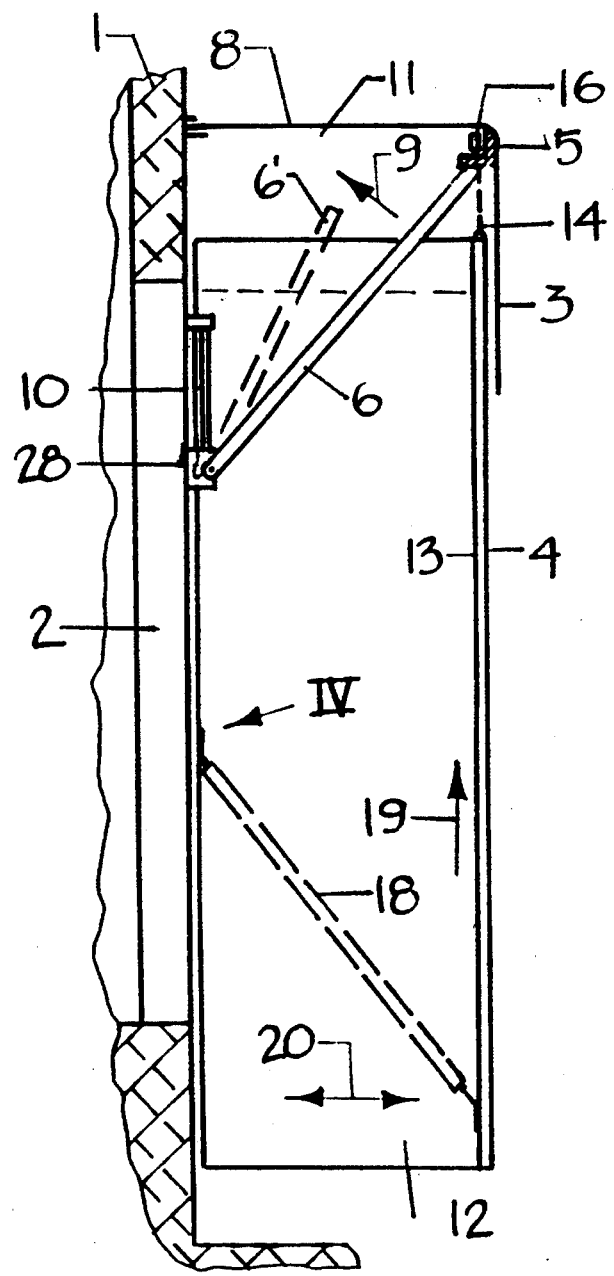
FIG. 2 shows a section along the line II—II of FIG. 1.
Figure 3:
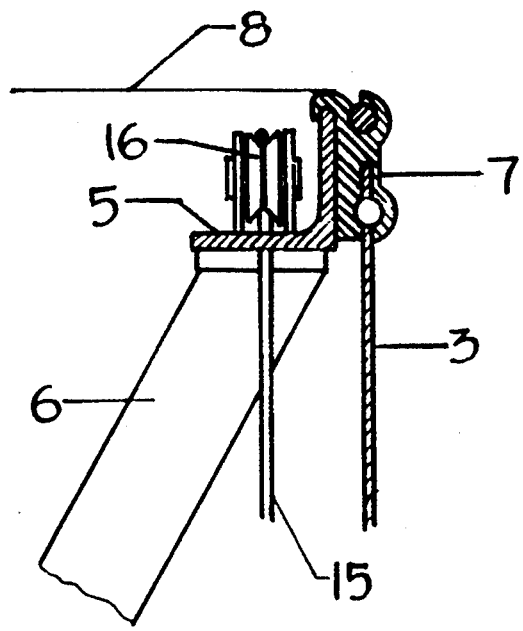
FIG. 3 shows a part-sectional view along the line III—III of FIG. 1.
Figure 4:
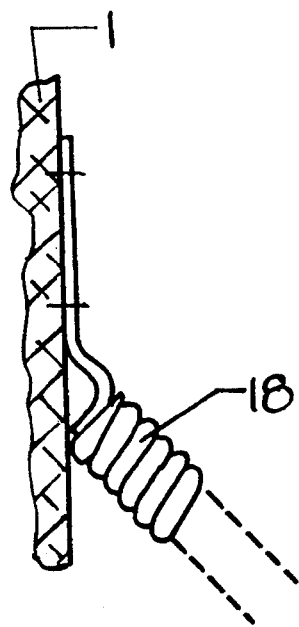
FIG. 4 shows a detail of FIG. 2 indicated at IV.

FIGS. 1 and 2 also show that the two strips 4, the metallic edge profile 13, and the side portions 12 end at a distance below the cover 8 and the transverse beam 5. The free space is however covered by the upper transverse portion 3 and at the two sides by the overhangs 11.

The side portions 12 are not held by supporting guide members that are connected to the building wall 1, but are held by cables 15 that engage the side portions 12 in the area indicated at 14. The cables 15 are guided through the transverse beam 5, guided about the rollers or pulleys 16 and connected to one another by a tension spring 17 that is arranged in a hidden manner. Additionally, the inner corners of the strips 4 are connected by an elastic pull 18a. However, it is also possible to support the strips 4 via upwardly oriented elastic pulls that are connected to the transverse beam 5.

In the area of its lower end, the edge profile 13 is connected to a very tightly wound coil spring 18 that is upwardly slanted at an angle of 30° to 60° relative to the vertical. The coil spring 18 is fixedly connected with its upper end to the building wall 1.

Since with the suspension with the aid of the cable 15 a support force, respectively, a pulling force in the direction of arrow 19, especially in the longitudinal direction of the edge profile 13, results, a corresponding force acts on the lower end of the coil spring 18, while simultaneously a pulling force 20 is introduced into the side portions 12. However, the fabric-reinforced material of the side portions 12 does not yield to such pulling forces. This means that in the rest position of the sealing device of the present invention a stretched contour of the side portions is provided and maintained. The slantedly oriented coil springs 18 which are pressure-rigid in the longitudinal direction, act as a stay that provides a spreading member for the side portions 12 and thus ensure the normal (rest) position according to the drawings. A further special feature of the mentioned coil spring 18 is that it can counteract lateral forces by elastically bending. Lateral forces which generally occur when the sealing device is under load by a vehicle thus result in an elastic deformation of the entire skirt inclusive side portions 12. When the vehicle is removed from the sealing device, the coil spring 18 returns into its stretched position and thus stretches the side portions 12.

Furthermore, due to the bending deformation of the coil spring 18 lateral movement of the edge profiles 13 in the direction of double arrow 21 may occur, most likely in the lower portion, but also in the upper portion of the strip 4 since the edge profile 13 is also able to follow a corresponding deflection in the upper portion due to the elasticity of the spring 17. Due to a comparatively great deformation of the strip, respectively, a correspondingly great load of the sealing device the coil spring 18 with tension spring properties may even bend under such loads. When the load ceases, the spring resumes its stretched position by returning the sealing device, especially, the side portions 12, into the original position.

The spreading device in the form of the coil spring 18 thus has practically no supporting function with respect to the weight load resulting from the strips 4 and the side portions 12. The necessary forces are practically provided by the tension spring 17.

Under certain conditions the coil spring 18 can be replaced by a stay extending in the same direction. The stay may be a metal rod etc. that must be pivotably connected to the building wall, respectively the edge profile. It is expedient to embody the pivot points such that not only a pivoting about a vertical axis is possible, but also about other axes, for example, in the manner of a ball joint. Optionally, the stay may be telescopic to be shortenable against the force of a spring that must return the device into the rest position shown in the drawings to thereby achieve spreading and stretching of the side portions 12.

The present invention is, of course, in no way restricted to the specific disclosure of the specification and drawings, but also encompasses any modifications within the scope of the appended claims.

What I claim is:

1. A deformable sealing device for a gap between a wall opening of a building wall and a back wall of a vehicle docking at the wall opening, said sealing device comprising:

a flap-shaped deformable skirt for receiving loads by the back wall of the vehicle docking at the wall opening, said skirt comprising an upper transverse portion with a transverse beam and two vertical strips that are arranged parallel to vertical sides of the wall opening;

a cover connected between said transverse beam and the building wall;

said vertical strips each having a vertically extending outer edge;

said skirt further comprising a first and a second flap-shaped, deformable, non-stiff side portions in the form of tarpaulins each said side portion having a forward edge connected to an outer edge of one of said vertical strips and a rearward edge connected to the building wall, wherein said side portions and said vertical strips are vertically spaced at a distance from said cover such that said side portions and said vertical strips are deformable in a direction toward the building wall independent of said upper transverse portion;

a suspending mechanism for suspending said side portions, said suspending mechanism engaging upper ends of said side portions and being elastic and bendable;

a stretching mechanism for maintaining a full horizontal extension of said side portions at a lower end thereof, when said sealing device is in a rest position; and further comprising two stays fixedly connected to ends of said transverse beam and extending in a slanted downward direction toward the building wall.

2. A sealing device according to claim 1, wherein said stretching mechanism has a longitudinal extension and wherein in a direction of said longitudinal extension said stretching mechanism is rigid to pressure loads but bendable and displaceable when forces act in a direction other than said direction of longitudinal extension.

3. A sealing device according to claim 1, wherein said side portions and said vertical strips are exclusively supported by said suspending mechanism.

4. A sealing device according to claim 1, wherein said stretching mechanism is comprised of a first stay for connecting said forward edge of said first side portion to the building wall and a second stay for connecting said forward edge of said second side portion to the building wall, said stays extending in a slanted downward direction from the building wall toward said forward edges.

5. A sealing device according to claim 4, wherein said stay is positioned at an angle of 30° to 60° to the vertical.

6. A sealing device according to claim 5, wherein said angle is substantially 45°.

7. A sealing device according to claim 1, wherein said suspending mechanism is comprised of a cable line and an intermediate tension spring, wherein said cable line is supported at said transverse beam.

8. A sealing device according to claim 7, wherein said cable line is hidden by said transverse beam.

9. A sealing device according to claim 1, wherein said stretching mechanism is a tightly wound tension spring.

10. A sealing device according to claim 9, wherein:
each said vertical strip has a stiffened edge profile at said outer edge; and
said tension spring has free ends fixedly connected to the building wall and said stiffened edge profile.

11. A sealing device according to claim 1, wherein said stretching mechanism is comprised of a first rigid stay pivotably connected to said first side portion and the building wall and a second rigid stay pivotably connected to said second side portion and the building wall.

12. A sealing device according to claim 1, wherein said upper transverse portion is liftable together with said transverse beam and said cover.

13. A sealing device according to claim 12, wherein a free end of each said stay is supported in a height-adjustable manner at the building wall.

14. A sealing device according to claim 1, further comprising a first and a second stiffened edge profiles for stiffening said outer edge of said two vertical strips and said forward edge of said first and second side portions.

15. A sealing device according to claim 13, wherein said stretching mechanism engages said stiffened edge profile.

16. A sealing device according to claim 1, wherein said stretching mechanism is elastically deformable.

17. A sealing device according to claim 1, wherein said suspending mechanism engages said upper edges of said side portions remote from the building wall, said upper edges being stiffened.

* * * * *